(12) United States Patent
Shinto et al.

(10) Patent No.: US 8,462,348 B2
(45) Date of Patent: Jun. 11, 2013

(54) TUNABLE INTERFERENCE FILTER, LIGHT SENSOR AND ANALYTICAL INSTRUMENT

(75) Inventors: Susumu Shinto, Shimosuwa (JP); Seiji Yamazaki, Fujimi (JP)

(73) Assignee: Seiko Epson Corporation (JP)

( * ) Notice: Subject to any disclaimer, the term of this patent is extended or adjusted under 35 U.S.C. 154(b) by 348 days.

(21) Appl. No.: 12/983,563

(22) Filed: Jan. 3, 2011

(65) Prior Publication Data

US 2011/0199617 A1      Aug. 18, 2011

(30) Foreign Application Priority Data

Feb. 16, 2010   (JP) .................................. 2010-030994

(51) Int. Cl.
   *G01J 3/45*       (2006.01)
(52) U.S. Cl.
   USPC .......................................... 356/454; 359/589
(58) Field of Classification Search
   USPC .......................................... 356/454; 359/589
   See application file for complete search history.

(56) References Cited

U.S. PATENT DOCUMENTS

| 7,301,703 B2 | 11/2007 | Nakamura et al. |
| 7,483,211 B2 | 1/2009 | Nakamura et al. |
| 2004/0218865 A1* | 11/2004 | Lu .................................. 385/39 |

FOREIGN PATENT DOCUMENTS

| JP | 2006-023606 | 1/2006 |
| JP | 2006-208791 | 8/2006 |
| JP | 2006-235606 | 9/2006 |

* cited by examiner

*Primary Examiner* — Tarifur Chowdhury
*Assistant Examiner* — Jonathon Cook
(74) *Attorney, Agent, or Firm* — Harness, Dickey & Pierce, P.L.C.

(57) ABSTRACT

In a tunable interference filter according to the invention, a second substrate includes a light transmission hole and alight transmissive member provided within the light transmission hole, and the light transmission hole is formed in a tapered shape having a diameter dimension of an inner circumferential surface increasing from the first surface toward the second surface, and the light transmissive member has a light incident surface in parallel to the first reflection surface and the second reflection surface, a light exiting surface in parallel to the first reflection surface and the second reflection surface, and a tapered side surface having a diameter dimension increasing from the first surface toward the second surface, and the tapered side surface is in contact with the inner circumferential surface of the light transmission hole.

6 Claims, 7 Drawing Sheets

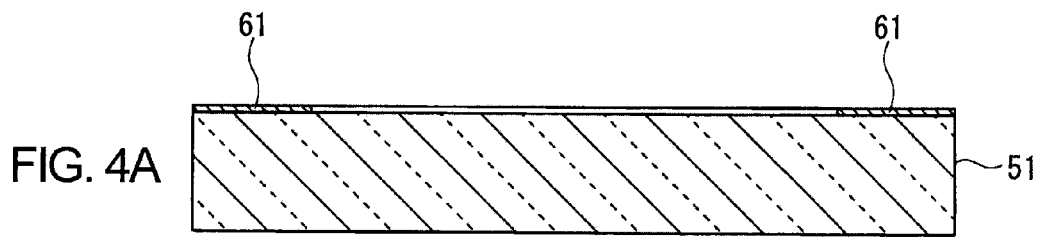
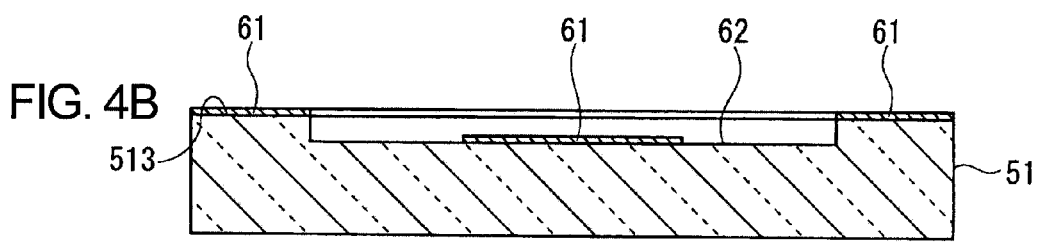
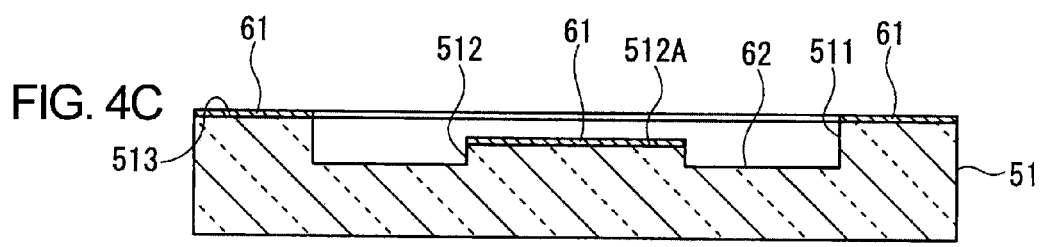
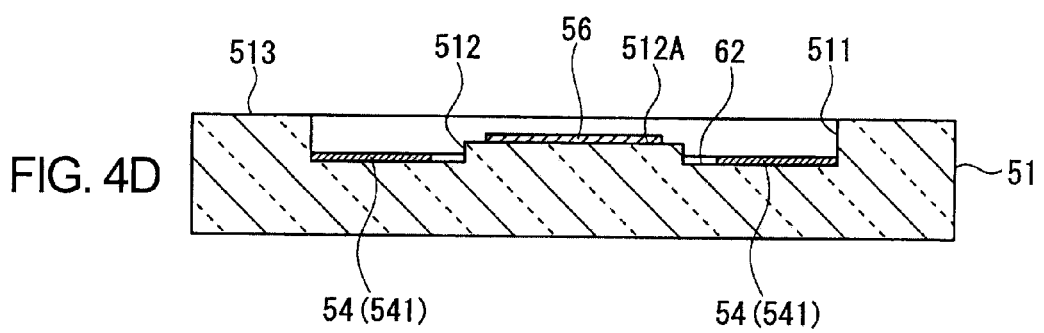

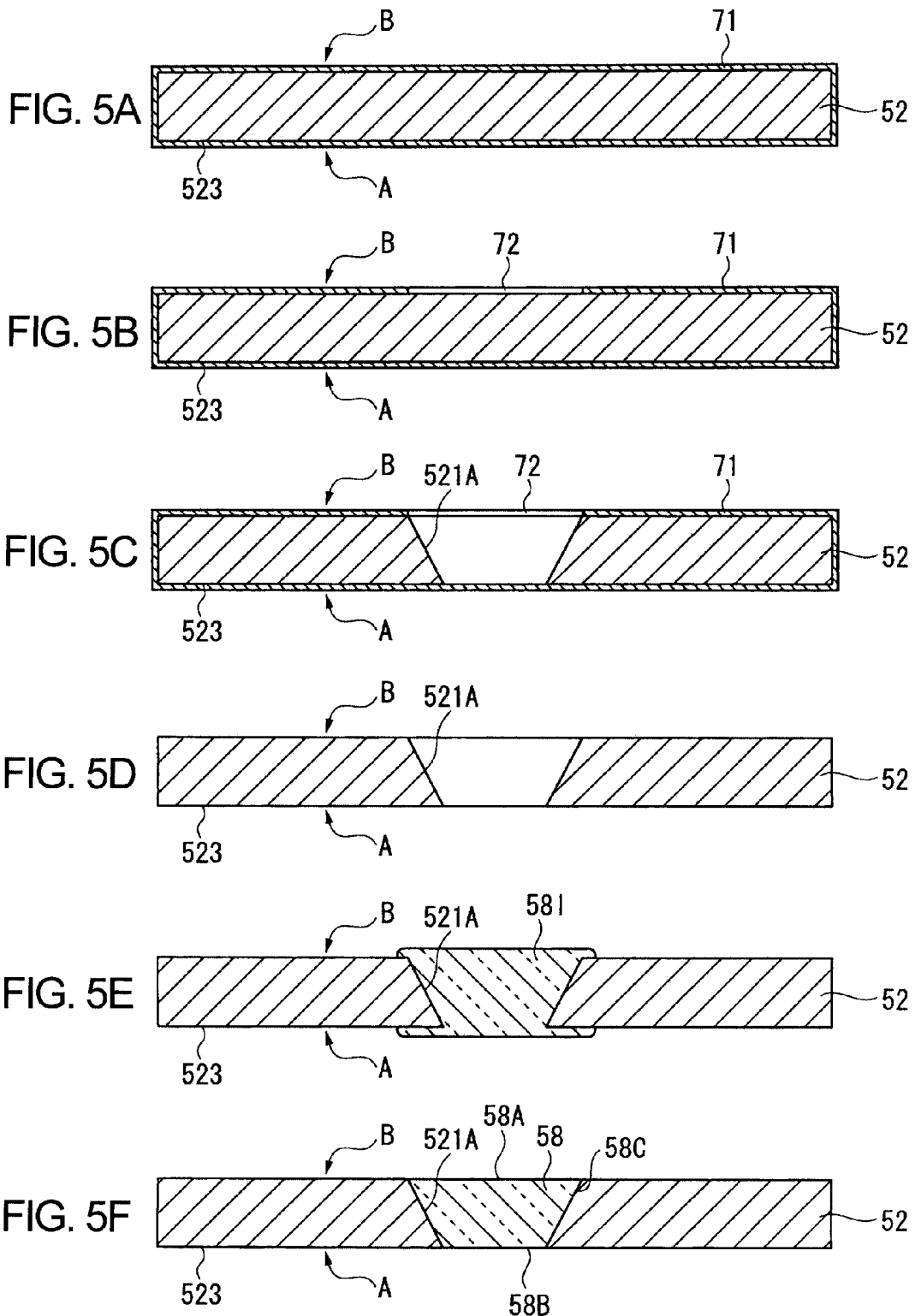

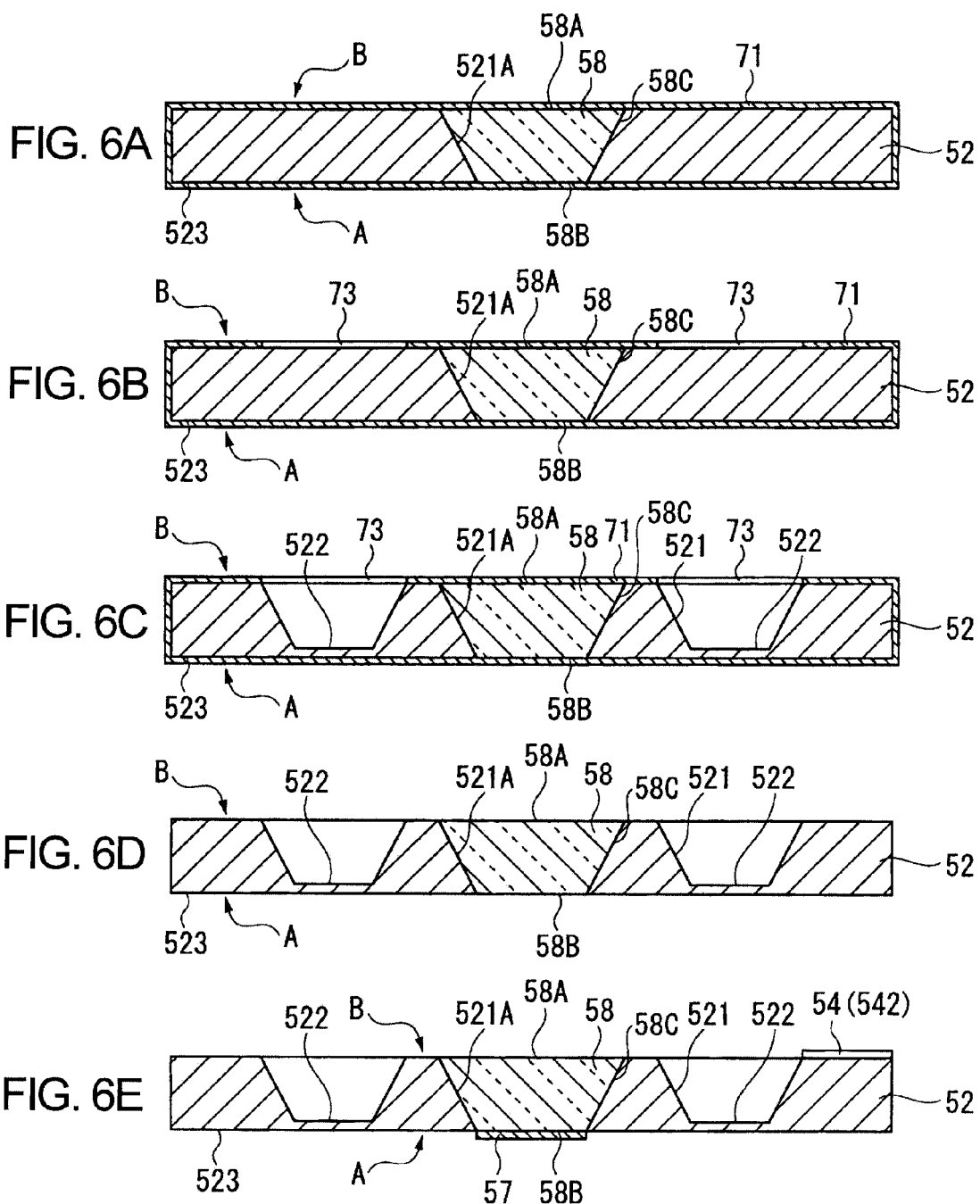

TUNABLE INTERFERENCE FILTER, LIGHT SENSOR AND ANALYTICAL INSTRUMENT

BACKGROUND

1. Technical Field

The present invention relates to a tunable interference filter, a light sensor and an analytical instrument.

2. Related Art

In related art, a tunable interference filter in which mirrors are oppositely provided on surfaces opposed to each other of a pair of glass substrates is known. In the tunable interference filter, lights are reflected between the pair of mirrors, only the light having a particular wavelength is transmitted, lights having other wavelengths are cancelled out by interferences, and thereby, the light having the particular wavelength is transmitted from incident lights.

Further, the tunable interference filter selects the wavelength of the light having the particular wavelength to be transmitted by adjustment of a gap between the pair of mirrors. For the purpose, of the pair of glass substrates, at least one is processed by etching to form a diaphragm and, for example, driving means such as an electrostatic actuator is provided between the pair of glass substrates. In the configuration, by controlling the driving means, the diaphragm can be displaced relative to the stacking direction of the glass substrates and the light having a desired wavelength can selectively be transmitted.

However, in the case where the diaphragm is formed by processing of the glass substrate by etching as described above, the time taken for etching increases and the manufacturing process becomes complex. Further, in the etching of the glass substrate, etching accuracy is not good, and the film uniformity of the diaphragm may vary and the spectroscopic accuracy may be affected.

On the other hand, a tunable interference filter using a silicon substrate that can reduce the etching time at manufacturing with high etching accuracy in place of the glass substrate is known (for example, see Patent Document 1 (JP-A-2006-23606)).

The tunable interference filter disclosed in Patent Document 1 is a tunable interference filter formed by bonding a fixed substrate and a movable substrate. On the fixed substrate, two cylindrical recess parts are formed on the surface facing the movable substrate, and a fixed reflection film and a conducting layer are formed in these recess parts.

Further, the movable substrate is formed by a conducting silicon substrate, and includes a movable part provided nearly at the center of the movable substrate, a support part that displaceably holds the movable part provided on the outer circumferential part of the movable part, and an energization part that energizes the movable part. Furthermore, the silicon substrate does not have light transmittance, and a light transmission part with a cylindrical inner circumferential surface is formed nearly at the center of the movable part, and glass is inserted and fitted in the light transmission part. In addition, a movable reflection film is formed on the surface of the movable part facing the first recess part and facing the fixed substrate.

In the tunable interference filter as disclosed in Patent Document 1, when the support part bends, the movable part displaces toward the fixed substrate side, and the support part and the movable part bend to be convex toward the fixed substrate side. Accordingly, stresses acting in the surface directions of the substrates are different between the substrate facing surface side facing the fixed substrate of the movable part and the incident surface side into which the light opposite to the substrate facing surface enters.

Specifically, at the incident surface side closer than the center position in the substrate thickness direction of the movable part, a force of contraction in the in-plane direction is applied, and the contraction force increases as the location separates farther from the center position. On the other hand, at the substrate facing surface side closer than the center position, a force pulling in the out-of-plane direction is applied, and the pulling force similarly increases as the location separates farther from the center position.

Accordingly, the glass inserted and fitted in the light transmission part is subjected to large lateral pressure as it separates farther from the center position at the incident surface side. Further, at the substrate facing surface side of the glass, the holding force for holding the glass decreases as it separates farther from the center position. Therefore, the glass is subjected to a force to be pushed down toward the fixed substrate side as a whole, and may project toward the fixed substrate side.

If the glass projects toward the fixed substrate side, the gap distance between the movable reflection film and the fixed reflection film varies. In this case, even when the gap distance between the reflection films is adjusted for extracting the light having the desired wavelength using the tunable interference filter, the wavelengths different from the wavelength as the target are extracted, and a problem that the spectroscopic accuracy of the tunable interference filter becomes lower arises.

Further, when the glass projects, the glass surface facing the fixed substrate tilts, and there is another problem that it may be impossible to maintain the fixed reflection film and the movable reflection film in parallel. In this case, the lights having wavelengths different from the wavelength as the target are extracted, and there are problems that the resolution of the transmitted wavelengths becomes lower and the spectroscopic accuracy of the tunable interference filter becomes lower.

As described above, in the tunable interference filter in related art as disclosed in Patent Document 1, there has been a problem that, when the movable part is displaced, the glass projects and it may be impossible to maintain good spectroscopic accuracy.

SUMMARY

An advantage of some aspects of the invention is to provide a tunable interference filter, a light sensor and an analytical instrument that can maintain spectroscopic accuracy.

A tunable interference filter according to an aspect of the invention includes: a first substrate having light transmissivity; a second substrate opposed and bonded to one surface side of the first substrate; a first reflection film provided on the one surface of the first substrate; a second reflection film provided on a first surface of the second substrate facing the first substrate and opposed to the first reflection film via a gap; and a variable part that varies the gap, wherein the second substrate includes a light transmission opening formed in a position facing the first reflection film along a substrate thickness direction and penetrated from the first surface of the second substrate to a second surface opposite thereto, and a light transmissive member provided within the light transmission opening, the light transmission opening is formed in a tapered shape having a diameter dimension of an inner circumferential surface increasing from the first surface toward the second surface, and the light transmissive member has a light incident surface in parallel to the first reflection surface and the second reflection surface, a light exiting surface in parallel to the first reflection surface and the second reflection surface, and a tapered side surface having a diameter dimension increasing from the first surface toward the second surface, and the tapered side surface is in contact with the inner circumferential surface of the light transmission opening.

According to the aspect of the invention, by bending the second substrate closer to the first substrate using the variable part, the gap dimension between the first reflection surface and the second reflection surface varies. In this regard, when the second substrate bends, stresses are generated to distort the shape of the light transmission opening. Specifically, on the light transmission opening, stresses act to expand it in the direction in which the diameter of the first surface side is larger and contract in the direction in which the diameter of the second surface side is smaller. Accordingly, the light transmissive member provided in the light transmission opening is subjected to lateral pressure at the second surface side by the stresses, and, as a whole, subjected to a push down force to push it down toward the first substrate side. Here, in the aspect of the invention, since the light transmission opening is formed in the tapered shape having a diameter smaller at the first surface side and the tapered side surface of the light transmissive member is in contact with the inner circumferential surface of the light transmission opening, even when the light transmissive member is subjected to a force to be pushed out toward the first substrate side, the move of the light transmissive member may be restricted. Accordingly, even when the movable part is displaced, the light transmissive member does not project toward the first substrate side, and light having a desired wavelength may be extracted with high resolution and good spectroscopic accuracy may be maintained.

Further, in the aspect of the invention, since light is guided between the first reflection film and the second reflection film by the light transmissive member provided in the light transmission opening of the second substrate, the second substrate is not necessary to have light transmittance. Therefore, the degree of freedom of choice of the material of the second substrate becomes greater, and a material with emphasis on workability at manufacturing of the improvement of the etching accuracy and the shortening of the etching time may be selected.

In the tunable interference filter according to the aspect of the invention, the second reflection film is provided within a plane of the light exiting surface.

According to the aspect of the invention, bending of the second reflection film is prevented and the parallelism of the first reflection film and the second reflection film may be maintained. That is, when the second substrate bends toward the first substrate side, a gap or a level difference may be produced between the light exiting surface of the light transmissive member and the first surface of the second substrate. Therefore, in the case where the second reflection film is formed from the light exiting surface of the light transmissive member to the first surface of the second substrate, the second reflection film is distorted by the gap or level difference and the parallel relation between the first reflection surface and itself may not be maintained. On the other hand, as in the aspect of the invention, by providing the second reflection film within the surface of the light exiting surface of the light transmissive member, even when the gap or level difference is produced, the second reflection film may not be affected by it or bent.

Further, when the second substrate bends, the first surface side is a quadric surface convex downward, and the distortion of the light exiting surface and the light incident surface of the light transmissive member can effectively be prevented using a material having higher hardness than that of the second substrate such as glass, for example. In this case, by providing the second reflection film within the light exiting surface of the light transmissive member, the distortion of the second reflection film may be prevented and the spectroscopic accuracy may be improved.

In the tunable interference filter according to the aspect of the invention, it is preferable that the first substrate is formed by glass having movable ions, the second substrate has conductivity, and the first substrate and the second substrate are bonded by anodically-bonding.

Here, the first substrate may be a conducting metal substrate such as a silicon substrate, for example, and a substrate with the surface to be bonded to the second substrate on which a conductive film (for example, a metal thin film) is formed, for example.

According to the aspect of the invention, the first substrate and the second substrate are bonded by anodically-bonding. In the anodically-bonding, by applying a negative voltage to glass under a high temperature at which movable ions (sodium ions) in the glass easily move, the movable ions are moved from the glass surface and electrostatic attractive force is generated for bonding to the second substrate. In the anodically-bonding, the first substrate and the second substrate may directly be bonded with high bonding strength.

Accordingly, the first substrate and the second substrate may be bonded with high accuracy in parallel compared to the case where the first substrate and the second substrate are bonded via a bonding layer of an adhesive agent or the like, and the spectroscopic accuracy in the tunable interference filter may be improved.

In the tunable interference filter according to the aspect of the invention, it is preferable that the second substrate is formed by silicon.

According to the aspect of the invention, silicon is selected as the material of the second substrate. Silicon has a crystal structure, and easy and rapid etching can be performed by crystal anisotropic etching using the difference of crystal orientation. Therefore, by selecting silicon for the second substrate, at etching of the second substrate, the improvement of the etching accuracy and the shortening of the etching time may be realized compared to glass having no crystal structure, for example.

Therefore, processing of the second substrate becomes easier and the productivity of the tunable interference filter may be improved.

A light sensor according to another aspect of the invention includes the tunable interference filter, and a light receiving unit that receives light to be inspected transmitted through the tunable interference filter.

As described above, in the tunable interference filter, even when the second substrate bends toward the first substrate side, the light transmissive member does not project toward the first substrate side, and the gap dimension between the first reflection film and the second reflection film does not vary and the parallel state may be maintained, and good spectroscopic accuracy may be maintained.

By receiving the output light output from the tunable interference filter using the light receiving unit, the light sensor may measure the correct amount of the light component having a desired wavelength contained in the light to be inspected.

An analytical instrument according to still another aspect of the invention includes the light sensor.

According to the aspect of the invention, in the tunable interference filter, when the second substrate bends, the light transmissive member projects toward the first substrate side, the gap dimension between the first reflection film and the second reflection film may not vary and the spectroscopic accuracy may be maintained, and the amount of light having a desired wavelength contained in the light to be inspected may correctly be detected in the light receiving unit of the light sensor. Therefore, also, in a processing unit, the light to be inspected may be analyzed with high accuracy based on the correct amount of the light having the desired wavelength contained in the light to be inspected.

BRIEF DESCRIPTION OF THE DRAWINGS

The invention will be described with reference to the accompanying drawings, wherein like numbers reference like elements.

FIGS. 4A to 4D show a manufacturing process of a first substrate of the etalon, and FIG. 4A is a schematic diagram of a resist forming step of forming a resist for mirror fixing surface formation on the first substrate, FIG. 4B is a schematic diagram of a first groove forming step of forming the mirror fixing surface, FIG. 4C is a schematic diagram of a second groove forming step of forming an electrode fixing surface, and FIG. 4D is a schematic diagram of an AgC forming step of forming an AgC layer.

FIGS. 5A to 5F show an outline of a manufacturing process of a second substrate, and FIG. 5A is a schematic diagram of a first $SiO_2$ forming step of forming silicon oxide ($SiO_2$) on a surface of the second substrate, FIG. 5B is a schematic diagram of an $SiO_2$ patterning step of removing the $SiO_2$ in a position corresponding to a light transmission opening of the second substrate and patterning for Si etching, FIG. 5C is a schematic diagram of a light transmission opening forming step of forming the light transmission opening by Si etching, FIG. 5D is a schematic diagram of an $SiO_2$ removing step of removing $SiO_2$ on the second substrate surface, FIG. 5E is a schematic diagram of a low-melting-point glass filling step of filling the light transmission opening with low-melting-point glass, and FIG. 5F is a schematic diagram of a low-melting-point glass grinding step of grinding the filling low-melting-point glass to be level with the second substrate surface.

FIG. 6A to 6E show an outline of a manufacturing process of the second substrate, and FIG. 6A is a schematic diagram of a second $SiO_2$ forming step of forming a silicon oxide film on the second substrate and the low-melting-point glass, FIG. 6B is a schematic diagram of a second $SiO_2$ patterning step of removing the silicon oxide film in a position corresponding to a connection holding part of the second substrate and forming a second etching pattern, FIG. 6C is a schematic diagram of a connection holding part forming step of forming the connection holding part by etching the second etching pattern, FIG. 6D is a schematic diagram of an $SiO_2$ removing step of removing all silicon oxide film on the second substrate surface on which the connection holding part has been formed, and FIG. 6E is a schematic diagram of an electrode and mirror forming step of providing a second displacement electrode and a movable mirror.

DESCRIPTION OF EXEMPLARY EMBODIMENTS

Hereinafter, an analytical instrument of one embodiment according to the invention will be described with reference to the drawings.

1. Overall Configuration of Analytical Instrument

Figure 1:
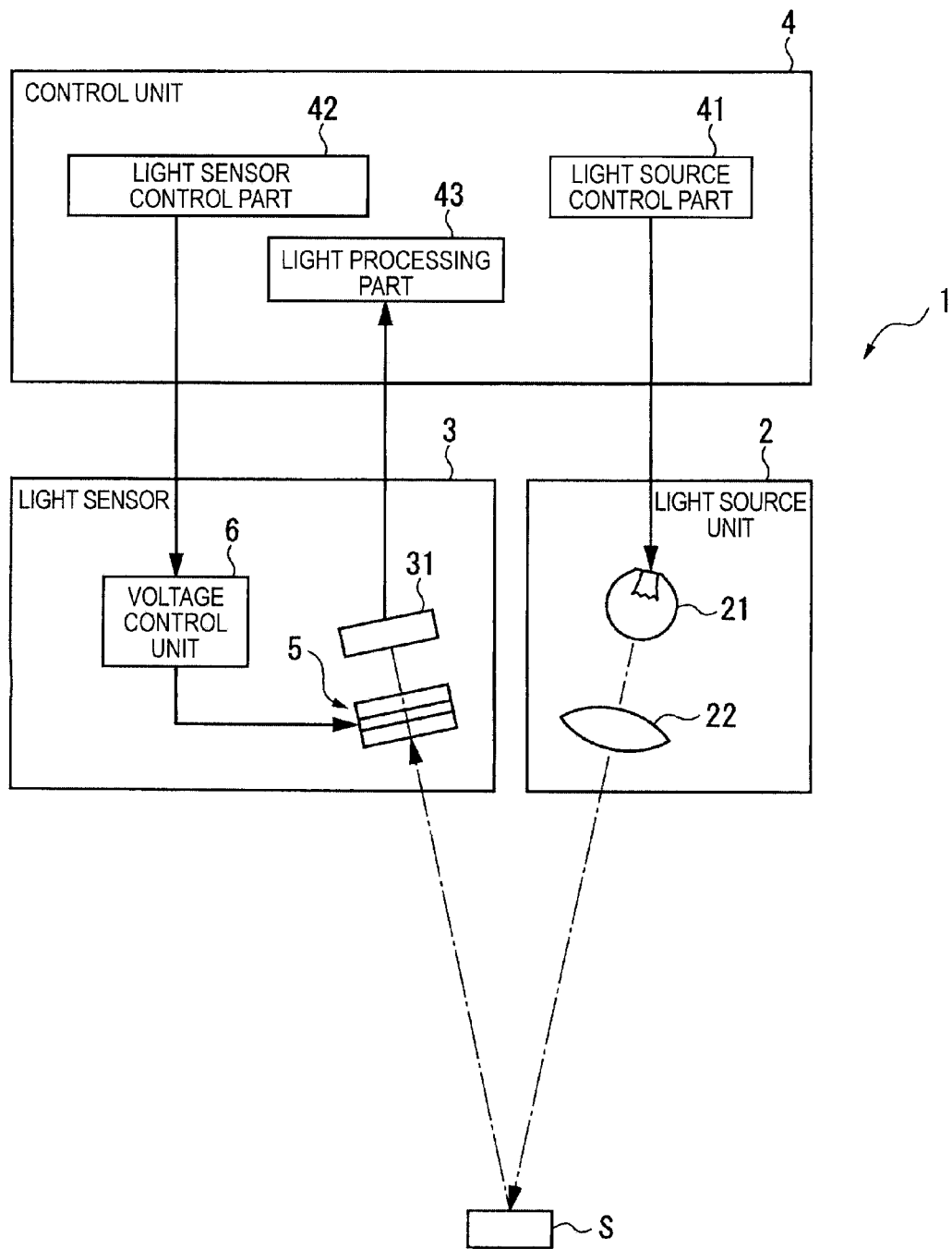
FIG. 1 shows a schematic configuration of an analytical instrument of one embodiment according to the invention.

FIG. 1 shows a schematic configuration of an analytical instrument of one embodiment according to the invention.

The analytical instrument 1 includes a light source unit 2 that outputs light to a subject of inspection S, a light sensor 3 according to an embodiment of the invention, a control unit 4 that controls the entire operation of the analytical instrument 1 as shown in FIG. 1. Further, the analytical instrument 1 is an analytical instrument by allowing the light output from the light source unit 2 to be reflected on the subject of inspection S, receiving the reflected light to be inspected by the light sensor 3, and analyzing the light to be inspected based on a detection signal output from the light sensor 3.

2. Configuration of Light Source Unit

The light source unit 2 includes a light source 21 and plural lenses 22 (only one is shown in FIG. 1), and outputs white light to the subject of inspection S. Further, the plural lenses 22 include a collimator lens, and the light source unit 2 brings the white light output from the light source 21 into parallel light by the collimator lens and outputs it from a projection lens (not shown) toward the subject of inspection S.

3. Configuration of Light Sensor

The light sensor 3 includes an etalon 5 forming a tunable interference filter according to an embodiment of the invention, a light receiving device 31 as a light receiving unit that receives light transmitted through the etalon 5, and a voltage control unit 6 that varies a wavelength of the light transmitted through the etalon 5 as shown in FIG. 1. Further, the light sensor 3 includes an incident optical lens (not shown) that guides the reflected light (light to be inspected) reflected on the subject of inspection S inward in a position facing the etalon 5. Further, the light sensor 3 spectroscopically separates only the light having a predetermined wavelength of the lights to be inspected entering from the incident optical lens, and receives the spectroscopically separated light by the light receiving device 31.

The light receiving device 31 includes plural photoelectric conversion elements and generates electric signals in response to amounts of received light. Further, the light receiving device 31 is connected to the control unit 4, and outputs the generated electric signals as light reception signals to the control unit 4.

3-1. Configuration of Etalon

Figure 2:
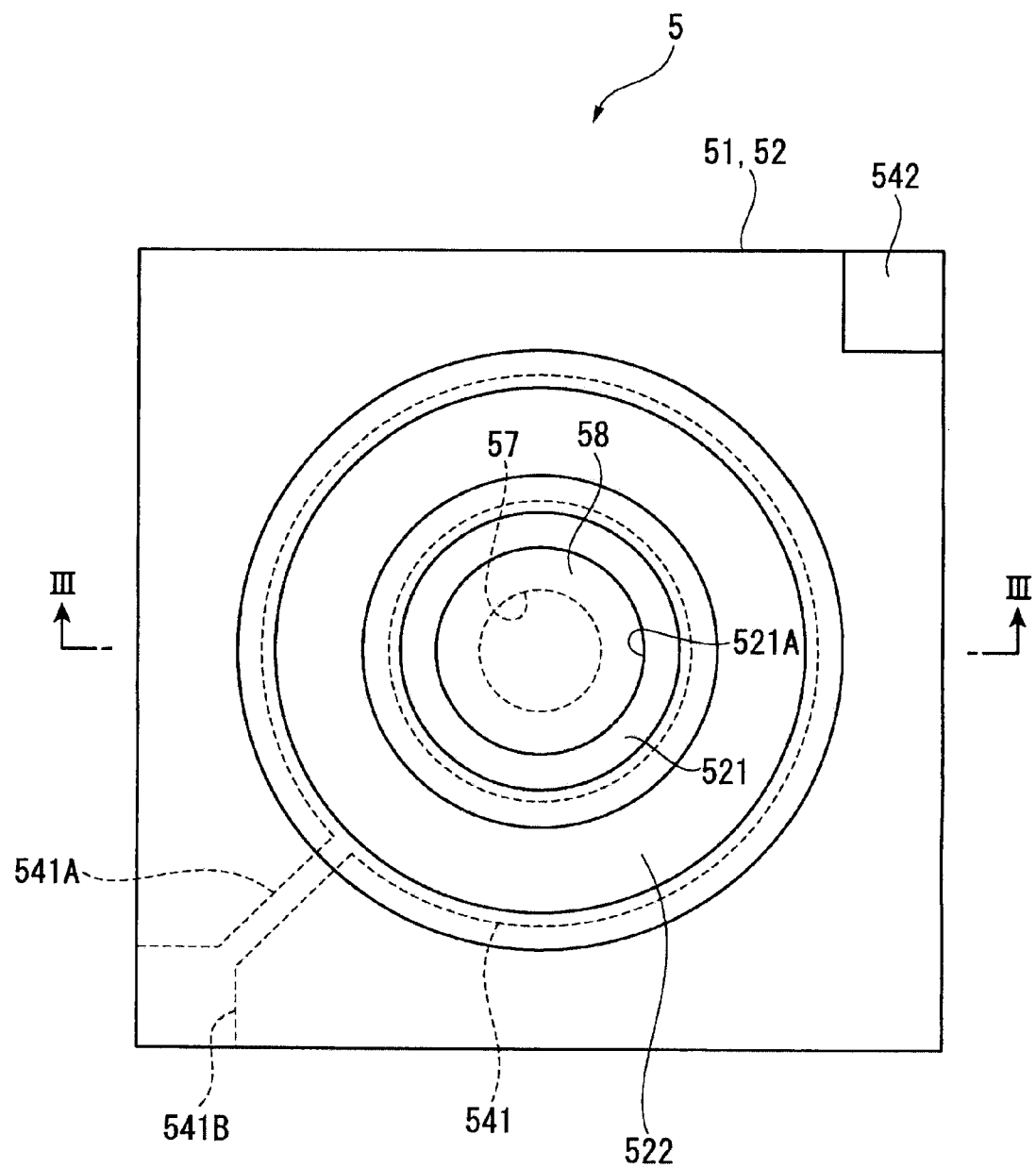
FIG. 2 is a plan view showing a schematic configuration of an etalon forming a tunable interference filter of the embodiment.
Figure 3:
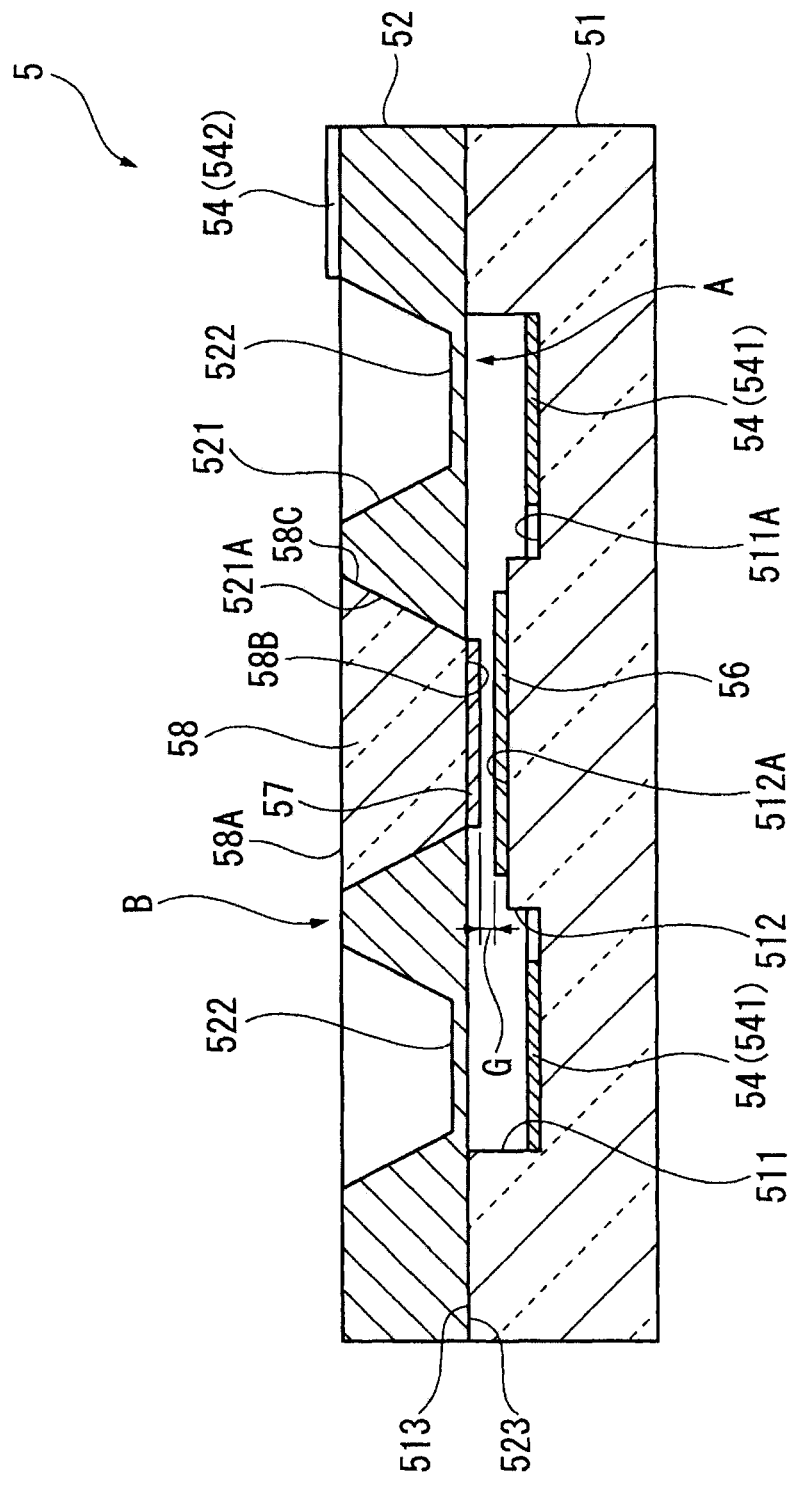
FIG. 3 is a sectional view when the etalon is cut along III-III line in FIG. 2.

FIG. 2 is a plan view showing a schematic configuration of the etalon 5 forming the tunable interference filter according to the embodiment of the invention, and FIG. 3 is a sectional view showing a schematic configuration of the etalon 5. While the light to be inspected enters the etalon 5 from the lower side of the drawing in FIG. 1, the light to be inspected enters from the left side of the drawing in FIG. 3.

The etalon 5 is a plate-like optical member having a planar square shape as shown in FIG. 2, and one side is formed in 10 mm, for example. The etalon 5 includes a fixed substrate 51 as a first substrate and a movable substrate 52 as a second substrate as shown in FIG. 3. The fixed substrate 51 is preferably glass containing movable ions such as sodium ions or potassium ions, for example, and, by forming the fixed substrate 51 using the glass, adhesion of a fixed mirror 65 and respective electrodes, which will be described later, may be improved. Further, as a constituent material of the movable substrate 52, a conducting material, for example, silicon is preferably used. By forming the movable substrate 52 using silicon, the etching accuracy may be improved and the etching time may be shortened. Furthermore, the two substrates 51, 52 are integrally formed by anodically-bonding bonded surfaces 513, 523 formed near the outer circumferential part.

Further, the fixed mirror 56 as a first reflection film and a movable mirror 57 as a second reflection film according to an embodiment of the invention are provided between the fixed substrate 51 and the movable substrate 52. Here, the fixed mirror 56 is fixed to the surface of the fixed substrate 51 facing the movable substrate 52, and the movable mirror 57 is fixed to the surface of the movable substrate 52 facing the fixed substrate 51. Further, the fixed mirror 56 and the movable mirror 57 are oppositely provided via a gap between mirrors G as a gap dimension.

Furthermore, an electrostatic actuator 54 as a variable part for adjustment of the dimension of the gap between mirrors G between the fixed mirror 56 and the movable mirror 57 is provided between the fixed substrate 51 and the movable substrate 52.

3-1-1. Configuration of Fixed Substrate

The fixed substrate 51 is formed by processing a glass base material formed in a thickness of 500 μm, for example, by etching. Specifically, as shown in FIG. 3, an electrode formation groove 511 and a mirror fixing part 512 are formed on the fixed substrate 51 by etching.

The electrode formation groove 511 is formed in a circular shape around a planar center point in a plan view of the etalon 5 seen from a thickness direction as shown in FIG. 2 (hereinafter, referred to as "etalon plan view"). The mirror fixing part 512 is formed to project from the center part of the electrode formation groove 511 toward the movable substrate 52 in the plan view.

In the electrode formation groove 511, a ring-shaped electrode fixing surface 511A is formed between the outer circumferential edge of the mirror fixing part 512 and the inner circumferential wall of the electrode formation groove 511, and a first displacement electrode 541 is formed on the electrode fixing surface 511A. Further, from a part of the outer circumferential edge of the first displacement electrode 541, in the etalon plan view as shown in FIG. 2, first displacement electrode lead parts 541A are respectively formed to extend toward one apex of the etalon 5 (toward the lower left in the example shown in FIG. 2). Furthermore, at the leading ends of the first displacement electrode lead parts 541A, first displacement electrode pads 541B are respectively formed and the first displacement electrode pads 541B are connected to the voltage control unit 6.

The mirror fixing part 512 is formed in a cylindrical shape having a smaller diameter dimension than that of the electrode formation groove 511 coaxially with the electrode formation groove 511 as described above. Note that, in the embodiment, as shown in FIG. 3, the case where a mirror fixing surface 512A of the mirror fixing part 512 facing the movable substrate 52 is formed closer to the movable substrate 52 than the electrode fixing surface 511A is shown, however, not limited to that. The height positions of the electrode fixing surface 511A and the mirror fixing surface 512A are appropriately set according to the dimension of the gap between mirrors G between the fixed mirror 56 and the mirror fixing surface 512A and the movable mirror 57 formed on the movable substrate 52, the dimension between the first displacement electrode 541 and the movable substrate 52 facing the first displacement electrode 541 and the thickness dimensions of the fixed mirror 56 and the movable mirror 57, and not limited to the above described configuration. For example, a dielectric multilayer mirror is used as the mirrors 56, 57, and, in the case where its thickness dimension increases, a configuration in which the electrode fixing surface 511A and the mirror fixing surface 512A are formed on the same surface, or a configuration in which a mirror fixing groove as a cylindrically recessed groove is formed at the center of the electrode fixing surface 511A and the mirror fixing surface 512A is formed on the bottom surface of the mirror fixing groove may be employed.

Further, it is preferable that the groove depth of the mirror fixing surface 512A of the mirror fixing part 512 is designed in consideration of the wavelength range transmitted through the etalon 5. For example, in the embodiment, the initial value of the gap between mirrors G between the fixed mirror 56 and the movable mirror 57 (the dimension of the gap between mirrors G under the condition that no voltage is applied between the first displacement electrode 541 and a second displacement electrode 542) is set to 450 nm, and, by applying a voltage between the first displacement electrode 541 and the second displacement electrode 542, the movable mirror 57 can be displaced until the gap between mirrors G becomes 250 nm, for example. Thereby, by varying the voltage between the first displacement electrode 541 and the second displacement electrode 542, the lights having wavelengths in the entire visible light range can be selectively and spectroscopically separated and transmitted. In this case, the film thicknesses of the fixed mirror 56 and the movable mirror 57 and the height dimensions of the mirror fixing surface 512A and the electrode fixing surface 511A may be set to values that can displace the gap between mirrors G from 250 nm to 450 nm.

Further, the fixed mirror 56 formed in a circular shape having a diameter of about 3 mm is fixed to the mirror fixing surface 512A. The fixed mirror 56 is a mirror formed by an AgC single layer, and formed on the mirror fixing surface 512A using a technique such as sputtering.

Note that, in the embodiment, the example using the mirror of the AgC single layer that can cover the entire visible light range as the wavelength range that can be spectroscopically separated by the etalon 5 is shown, however, not limited to that, for example, a configuration of using $TiO_2$—$SiO_2$ dielectric multilayer mirror by which the wavelength range that can be spectroscopically separated by the etalon 5 is narrower but the transmittance of the spectroscopically separated lights is larger, the half-value breadth of the transmittance is narrower, and the resolution is better than the AgC single layer mirror may be employed. In this case, as described above, it is necessary to appropriately set the height positions of the mirror fixing surface 512A and the electrode fixing surface 511A of the fixed substrate 51 according to the fixed mirror 56 and the movable mirror 57, the wavelength selection range of the lights to be spectroscopically separated, or the like.

Furthermore, on the lower surface of the fixed substrate 51 opposite to the upper surface facing the movable substrate 52, an anti-reflection film (AR) (not shown) is formed in a position corresponding to the fixed mirror 56. The anti-reflection film is formed by alternately stacking low-refractive-index films and high-refractive-index films, and reduces the reflectance of the visible light on the surface of the fixed substrate 51 and increases the transmittance.

3-1-2. Configuration of Movable Substrate

The movable substrate 52 is formed by processing the silicon base material formed in a thickness of 200 μm, for example, by etching.

Specifically, in the movable substrate 52, in the plan view as shown in FIG. 2, a movable part 521 having a circular shape around a substrate center point, and a connection holding part 522 that holds the movable part 521 coaxiallys with the movable part 521 are provided.

As shown in FIG. 3, the movable part 521 is formed to have a thickness dimension larger than that of the connection holding part 522, and, for example, in the embodiment, formed to have the same dimension of 200 μm as the thickness dimension of the movable substrate 52. Further, the silicon base material is used as the movable substrate 52, however, not limited to that, any conducting base material that is easy to be formed and processed by etching may be used.

Further, in the movable part 521, in the plan view as shown in FIG. 2, a light transmission opening 521A coaxial with the movable part 521 is formed. The light transmission opening 521A is formed in a tapered shape communicated from a first surface A of the movable substrate 52 facing the fixed substrate 51 and a second surface B as a light-incident side surface of the light to be inspected and broadened from the first surface A toward the second surface B. Furthermore, in the light transmission opening 521A, low-melting-point glass 58 having a light incident surface 58A in parallel to the fixed mirror 56, a light exiting surface 58B in parallel to the fixed mirror, and a tapered side surface 58C having a tapered shape with the diameter dimension increasing from the first surface A toward the second surface B, the tapered side surface 58C in contact with the inner circumferential side surface of the light transmission opening 521A, is provided.

The low-melting-point glass 58 is formed by filling the light transmission opening 521A with the melted low-melting-point glass 58, and then, curing by cooling it and bonding it close to the inner circumferential surface of the light transmission opening 521A at the same time at manufacturing of the movable substrate 52. In this regard, when coefficients of thermal expansion are largely different between the movable substrate 52 and the low-melting-point glass 58, the movable substrate 52 as silicon may be broken at cooling of the low-melting-point glass 58. Accordingly, as the low-melting-point glass 58, a material having a coefficient of thermal expansion close to that of silicon is selected. As specific examples of the low-melting-point glass 58, $PbO$—$SiO_2$—$B_2O_3$, $PbO$—$P_2O_5$—$SnF_2$, etc. may be cited.

Note that a configuration in which the low-melting-point glass 58 that conforms to the shape of the light transmission opening 521A is formed in advance, and, for example, the low-melting-point glass 58 is bonded to the inner circumferential surface of the light transmission opening 521A by anodic bonding, adhesive bonding, or the like may be employed.

Furthermore, in the embodiment, the example using the low-melting-point glass 58 as a light-transmissive member has been shown, however, not limited to that, for example, a light transmissive member including a transparent resin material or the like may be used as long as it has light transmissivity.

Further, the movable mirror 57 is provided within the plane of the light exiting surface 58B of the low-melting-point glass 58, and a pair of the mirrors 56, 57 in parallel are formed by the above described fixed mirror 56 and movable mirror 57. Furthermore, in the embodiment, the gap between mirrors G between the movable mirror 57 and the fixed mirror 56 is set to 450 nm in the initial state.

Here, for the movable mirror 57, a mirror having the same configuration as that of the above described fixed mirror 56 is used, and, in the embodiment, an AgC single layer mirror is used. Further, the film thickness dimension of the AgC single layer mirror is formed in 0.03 μm, for example.

Furthermore, on the upper surface of the movable part 521 opposite to the mirror movable surface, an anti-reflection film (AR) (not shown) is formed in a position corresponding to the movable mirror 57. The anti-reflection film has the same configuration as that of the anti-reflection film formed on the fixed substrate 51, and formed by alternately stacking low-refractive-index films and high-refractive-index films.

The connection holding part 522 is a diaphragm surrounding the movable part 521 and formed to have a thickness dimension of 50 μm, for example. Further, the second displacement electrode 542 is provided on one apex (toward the upper right in the example shown in FIG. 2) at the second surface B side of the movable substrate 52.

3-2. Configuration of Voltage Control Unit

The voltage control unit 6 forms the tunable interference filter according to the embodiment of the invention together with the etalon 5. The voltage control unit 6 controls voltages applied to the first displacement electrode 541 and the second displacement electrode 542 of the electrostatic actuator 54 based on the control signals input from the control unit 4.

4. Configuration of Control Unit

The control unit 4 controls the entire operation of the analytical instrument 1.

As the control unit 4, for example, a general-purpose personal computer, a portable information terminal, and further, a colorimetry-dedicated computer or the like may be used.

Further, the control unit 4 includes a light source control part 41, a light sensor control part 42, and a light processing part 43 as shown in FIG. 1.

The light source control part 41 is connected to the light source unit 2. Further, the light source control part 41 outputs a predetermined control signal to the light source unit 2 based on the setting input by a user, for example, and allows the light source unit 2 to output white light with predetermined brightness.

The light sensor control part 42 is connected to the light sensor 3. Further, the light sensor control part 42 sets the wavelength of light to be received by the light sensor 3 based on the setting input by a user, for example, and outputs a control signal for detection of the amount of received light having the wavelength to the light sensor 3. Thereby, the voltage control unit 6 of the light sensor 3 sets the voltage applied to the electrostatic actuator 54 so that only the wavelength of the light desired by the user may be transmitted based on the control signal.

Here, regarding the light transmission opening 521A, when the movable substrate 52 bends toward the fixed substrate 51 side, the shape of the light transmission opening 521A is distorted due to the bending of the movable substrate 52. Specifically, the light transmission opening 521A is distorted in a direction in which the diameter at the first surface A side is larger and distorted in a direction in which the diameter at the second surface B side is smaller.

In this regard, since the light transmission opening 521A is formed in a tapered shape in which the diameter is smaller at the first surface A side in a position corresponding to the fixed mirror 56 and the movable mirror 57, even when the light transmission opening 521A is distorted, the tapered shape in which the diameter is smaller at the first surface A side is maintained.

5. Manufacturing Method of Etalon

Next, a manufacturing method of the etalon 5 will be explained with reference to the drawings.

5-1. Manufacture of Fixed Substrate

FIGS. 4A to 4D show a manufacturing process of the first substrate of the etalon 5, and FIG. 4A is a schematic diagram of a resist forming step of forming a resist for mirror fixing surface 512A formation on the fixed substrate 51, FIG. 4B is a schematic diagram of a first groove forming step of forming the mirror fixing surface 512A, FIG. 4C is a schematic diagram of a second groove forming step of forming the electrode fixing surface 511A, and FIG. 4D is a schematic diagram of an AgC forming step of forming an AgC layer.

For manufacturing the fixed substrate 51, first, a resist 61 is formed on a glass substrate as a manufacturing material of the fixed substrate 51 (the resist forming step) as shown in FIG. 4A, and a first groove 62 including the mirror fixing surface 512A is formed (the first groove forming step) as shown in FIG. 4B.

Specifically, at the resist forming step, the resist 61 is formed on the bonded surface 513. Then, at the first groove forming step, anisotropic etching is performed on parts other than the bonded surface 513 in which no resist 61 has been formed, and the first groove 62 including the mirror fixing surface 512A is formed.

Further, after the formation of the first groove 62, the resist 61 is formed in the formation position of the mirror fixing surface 512A of the first groove 62, and further, anisotropic etching is performed (the second groove forming step). Thereby, as shown in FIG. 4C, the electrode formation groove 511 and the mirror fixing part 512 are formed.

Then, the resist 61 on the fixed substrate 51 is removed, and an AgC thin film is formed on the surface facing the movable substrate 52 to have a thickness dimension of 30 nm, for example (the AgC forming step). Further, at the AgC forming step, the resist 61 is formed on the respective formation part of the fixed mirror 56 and formation part of the first displacement electrode 541 on the formed AgC thin film.

Then, by removing the AgC thin film in the parts provided with no resist 61, as shown in FIG. 4D, the fixed mirror 56 and the first displacement electrode 541 are formed (the AgC removing step).

In the above described manner, the fixed substrate 51 is formed.

5-2. Manufacture of Movable Substrate

Next, a manufacturing method of the movable substrate 52 will be explained.

FIGS. 5A to 5F show an outline of a manufacturing process of a second substrate, and FIG. 5A is a schematic diagram of a first $SiO_2$ forming step of forming silicon oxide ($SiO_2$) on the surface of the movable substrate 52, FIG. 5B is a schematic diagram of an $SiO_2$ patterning step of removing the $SiO_2$ in a position corresponding to the light transmission opening of the movable substrate 52 and patterning for Si etching, FIG. 5C is a schematic diagram of a light transmission opening forming step of forming the light transmission opening by Si etching, FIG. 5D is a schematic diagram of an $SiO_2$ removing step of removing $SiO_2$ on the movable substrate 52 surface, FIG. 5E is a schematic diagram of a low-melting-point glass filling step of filling the light transmission opening with low-melting-point glass, and FIG. 5F is a schematic diagram of a low-melting-point glass grinding step of grinding the filling low-melting-point glass to be level with the movable substrate 52 surface.

FIG. 6A to 6E show an outline of a manufacturing process of the second substrate, and FIG. 6A is a schematic diagram of a second $SiO_2$ forming step of forming a silicon oxide film 71 on the movable substrate 52 and the low-melting-point glass 58, FIG. 6B is a schematic diagram of a second $SiO_2$ patterning step of removing the silicon oxide film 71 in a position corresponding to the connection holding part 522 of the movable substrate 52 and forming a second etching pattern 73, FIG. 6C is a schematic diagram of a connection holding part forming step of forming the connection holding part 522 by etching the second etching pattern 73, FIG. 6D is a schematic diagram of an $SiO_2$ removing step of removing all silicon oxide film 71 on the movable substrate 52 surface on which the connection holding part 522 has been formed, and FIG. 6E is a schematic diagram of an electrode and mirror forming step of providing the second displacement electrode 542 and the movable mirror 57.

In the manufacture of the movable substrate 52, first, as shown in FIG. 5A, oxidation treatment is performed on the surface of the silicon substrate as a manufacturing material of the movable substrate 52, and the silicon oxide film 71 is formed (the first $SiO_2$ forming step). It is desirable that a silicon substrate of crystal orientation (100) is used for the silicon substrate, and the thickness of the silicon substrate is 0.5 mm or more for suppressing the bending of the movable mirror 57.

Then, as shown in FIG. 5B, the silicon oxide film 71 in the position corresponding to the light transmission opening 521A of the movable substrate 52 is removed and a first etching pattern 72 for exposing the movable substrate 52 is formed (the first $SiO_2$ patterning step). The patterning may be performed by wet etching using a buffer hydrofluoric acid solution or the like. Then, as shown in FIG. 5C, by etching the first etching pattern 72, the light transmission opening 521A is formed (the light transmission opening forming step). The etching may etch the silicon substrate using a potassium hydroxide solution or the like. Further, since the silicon substrate has crystal orientation (100), the etched silicon substrate is naturally tapered.

After the light transmission opening forming step, as shown in FIG. 5D, all of the silicon oxide film 71 on the movable substrate 52 surface on which the light transmission opening 521A has been formed is removed (the $SiO_2$ removing step). Then, as shown in FIG. 5E, the light transmission opening 521A is filled with low-melting-point glass 58I, and the light transmission opening 521A is filled up with the low-melting-point glass 58I (the low-melting-point glass filling step).

Then, as shown in FIG. 5F, the low-melting-point glass 58I running off the movable substrate 52 is ground to make the plane of the movable substrate 52 and the plane of the low-melting-point glass 58 level with each other, and the low-melting-point glass 58 as a light transmissive member is provided in the light transmission opening 521A (the low-melting-point glass grinding step). Further, if the surface of the low-melting-point glass 58 is rough, defects of diffused reflection and the like are caused. Accordingly, it is desirable that the surface roughness of the light existing surface is equal to or less than 1 nm in Ra.

After the low-melting-point glass grinding step, as shown in FIG. 6A, the silicon oxide film 71 is formed on the surface of the movable substrate 52 and the plane of the low-melting-point glass 58 level with the surface (the second $SiO_2$ forming step). Then, as shown in FIG. 6B, the silicon oxide film 71 in the position corresponding to the connection holding part 522 of the movable substrate 52 is removed, and the second etching pattern 73 for exposing the movable substrate 52 is formed (the second $SiO_2$ patterning step).

Then, as shown in FIG. 6C, the second etching pattern 73 is etched and the connection holding part 522 is formed (the connection holding part forming step).

In order to allow the connection holding part 522 to act as a diaphragm, it is necessary to etch its thickness to about 0.1 mm. For example, in the case where a part of a quartz substrate in 0.5 mm is etched to 0.1 mm using a buffer hydrofluoric acid solution, 50 hours or more is necessary. On the other hand, when the silicon substrate is etched using a potassium hydroxide solution, it can be processed in about 2.5 hours. Thus, it is very beneficial to use the silicon substrate for the movable substrate 52.

As shown in FIG. 6D, all of the silicon oxide film 71 on the movable substrate 52 surface on which the connection holding part 522 has been formed is removed (the $SiO_2$ removing step). Finally, as shown in FIG. 6E, the second displacement electrode 542 is provided on the upper surface of the movable substrate 52, and the movable mirror 57 is provided on the mirror movable surface (the electrode and mirror forming step). Thereby, the movable substrate 52 is formed.

5-3. Manufacture of Etalon

Next, a manufacture of the etalon 5 using the fixed substrate 51 and the movable substrate 52 manufactured in the above described manner will be explained.

In the manufacture of the etalon 5, a bonding step of bonding the fixed substrate 51 and the movable substrate 52 is executed. At the bonding step, the fixed substrate 51 and the movable substrate 52 are bonded by anodically-bonding or the like while the bonded surface 513 of the fixed substrate 51 and the bonded surface 523 of the movable substrate 52 are opposed.

In the case of bonding by anodically-bonding, for example, the fixed substrate 51 is connected to a minus terminal of a direct-current power supply (not shown) and the movable substrate 52 is connected to a plus terminal of the direct-current power supply (not shown), respectively. Then, a voltage is applied while the fixed substrate 51 is heated, and, by the heating, sodium ions in the fixed substrate 51 are easier to move. By the movement of the sodium ions, the bonded surface 513 of the fixed substrate 51 is negatively charged and the bonded surface 523 of the movable substrate 52 is positively charged. As a result, the fixed substrate 51 and the movable substrate 52 are strongly bonded.

6. Action and Effect of First Embodiment

In the embodiment, the movable substrate 52 is bent by the electrostatic actuator 54 to be closer to the fixed substrate 51, and thereby, the gap between mirrors G between the fixed mirror 56 and the movable mirror 57 varies. In this regard, the movable part 521 of the movable substrate 52 is formed to be thicker than the connection holding part 522 and its bending is restricted, and actually, it slightly bends. Accordingly, the low-melting-point glass 58 formed within the light transmission opening 521A formed in the movable part 521 is subjected to lateral pressure by the bending of the movable part 521 at the second surface B side closer than the center position in the substrate thickness direction of the movable substrate 52, and the lateral pressure increases as it separates farther from the center position.

On the other hand, at the first surface A side closer than the center position of the light transmission opening 521A, the glass is pulled toward the out-of-plane direction, and thereby, the close bonding strength between the inner circumferential surface of the light transmission opening 521A and the low-melting-point glass 58 becomes weaker. Therefore, a push down force to move the low-melting-point glass 58 toward the fixed substrate 51 is acted on the low-melting-point glass 58.

Here, the light transmission opening 521A is formed in the tapered shape having a diameter larger from the first surface A toward the second surface B, and the tapered side surface 58C of the low-melting-point glass 58 is in contact with the inner circumferential surface of the light transmission opening 521A. Accordingly, even when the above described push down force is applied, the tapered side surface 58C is restricted in move by the inner circumferential surface of the light transmission opening 521A, and does not project toward the fixed substrate 51 side.

That is, in the etalon 5 of the embodiment, since the movable substrate 52 bends, the low-melting-point glass 58 does not project toward the fixed substrate 51 side, and the gap between mirrors G between the fixed mirror 56 and the movable mirror 57 may accurately be controlled. Further, if the low-melting-point glass 58 projects, sometimes the light exiting surface 58B and the light incident surface 58A may not be maintained in parallel to the fixed mirror 56 depending on the state of lateral pressure, however, since there is no projection of the low-melting-point glass 58 as described above, the fixed mirror 56 and the movable mirror 57 may constantly be maintained in parallel. Therefore, in the embodiment, the etalon 5 that can maintain spectroscopic accuracy may be obtained.

Note that, since the low-melting-point glass 58 is provided on the movable substrate 52, it is not necessary to select a light transmissive material for the movable substrate 52. Accordingly, the degree of freedom of choice of the material of the movable substrate 52 becomes greater, and the material that may realize the improvement of the etching accuracy and the shortening of the etching time can be selected.

In the embodiment, bending of the movable mirror 57 may be prevented and the fixed mirror 56 and the movable mirror 57 may be maintained in parallel. That is, when the movable substrate 52 bends toward the fixed substrate 51 side, a gap or a level difference may be produced between the light exiting surface 58B of the low-melting-point glass 58 and the first surface A of the movable substrate 52. Therefore, in the case where the movable mirror 57 is formed from the light exiting surface 58B of the low-melting-point glass 58 to the first surface A of the movable substrate 52, the movable mirror 57 may be distorted by the above described gap or level difference and the parallel relation between the fixed mirror 56 and itself may not be maintained. On the other hand, as in the embodiment, by providing the movable mirror 57 within the surface of the light exiting surface 58B of the low-melting-point glass 58, even when the above described gap or level difference is produced, the movable mirror 57 may not be affected by it or bent.

Further, when the movable substrate 52 bends, the first surface Aside is a quadric surface convex downward, and the distortion of the light exiting surface 58B and the light incident surface 58A of the light transmissive member can effectively be prevented using a material having higher hardness than that of the movable substrate 52 such as the low-melting-point glass 58, for example. In this case, by providing the movable mirror 57 within the light exiting surface 58B of the light transmissive member, the distortion of the movable mirror 57 may be prevented and the spectroscopic accuracy may be improved.

In the embodiment, since the fixed substrate 51 and the movable substrate 52 are bonded by anodically-bonding, the fixed substrate 51 and the movable substrate 52 may directly be bonded. Accordingly, it is not likely that the fixed substrate 51 and the movable substrate 52 are not in parallel by the thickness variations of the adhesive layer as in the case where they are bonded by an adhesive agent or the like, and thereby, the parallel relation between the fixed mirror 56 and the movable mirror 57 is distorted. Therefore, in the embodiment, the spectroscopic accuracy may be maintained with higher accuracy.

In the embodiment, since silicon is selected as the material of the movable substrate 52, the improvement of the etching accuracy and the shortening of the etching time may be realized.

Thus, the processing of the movable substrate 52 becomes easier and the productivity of the etalon 5 may be improved.

In the embodiment, in the etalon 5, even when the movable substrate 52 bends, the low-melting-point glass 58 may project toward the fixed substrate 51 side and the gap between mirrors G between the fixed mirror 56 and the movable mirror 57 may not vary, and thus, the spectroscopic accuracy may be maintained.

By receiving the output light output from the etalon 5 using the light receiving device 31, the light sensor 3 may measure the correct amount of the light component having a desired wavelength contained in the light to be inspected.

In the embodiment, in the etalon 5, even when the movable substrate 52 bends, the low-melting-point glass 58 may project toward the fixed substrate 51 side and the gap between mirrors G between the fixed mirror 56 and the movable mirror 57 may not vary, and thus, the spectroscopic accuracy may be maintained. The light receiving device 31 of the light sensor 3 may correctly detect the amount of light of the desired wavelength contained in the light to be inspected. Therefore, also, in the control unit 4, the light to be inspected may be analyzed with accuracy based on the correct amount of light having the desired wavelength contained in the light to be inspected.

MODIFIED EXAMPLE

Note that the invention is not limited to the above described embodiment, however, modifications, improvements, etc. within the range in which the purpose of the invention may be achieved are contained in the invention.

Figure 7:
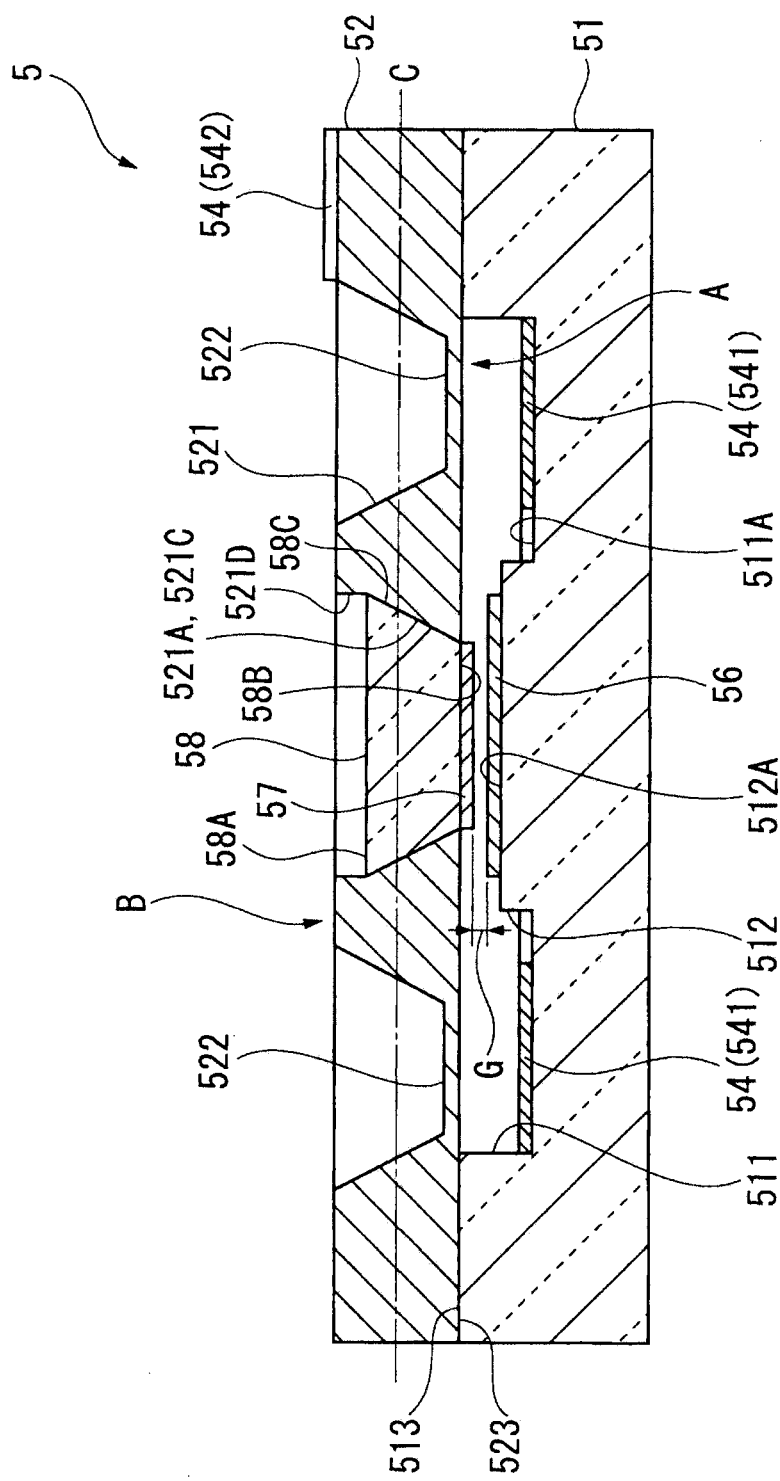
FIG. 7 is a sectional view showing a schematic configuration of an etalon forming a tunable interference filter in a modified example.

FIG. 7 is a sectional view showing a schematic configuration of an etalon forming a tunable interference filter in a modified example.

As shown in FIG. 7, a light transmission opening 521A coaxial with the movable part 521 is formed in the movable substrate 52. The light transmission opening 521A has a tapered part 521C formed in a tapered shape communicated from a first surface A of the movable substrate 52 facing the fixed substrate 51 and a second surface B as a light incident-side surface of the light to be inspected and broadened from the first surface A toward the second surface B, and a cylindrical part 521D formed in a cylindrical shape from the upper end of the tapered part 521C to the second surface B in the vertical direction. Further, the upper end of the tapered part 521C is formed at the upper side closer than the center C in the thickness direction of the movable substrate 52, and thereby, the second surface B side is the cylindrical part 521D. Furthermore, the low-melting-point glass 58 is not formed in the cylindrical part 521D.

In the configuration, the tapered part 521C is formed from the center C in the thickness direction of the movable part 521 to the second surface B side, and the low-melting-point glass 58 is provided in contact with the tapered part 521C. Accordingly, as is the case of the embodiment, even when the low-melting-point glass 58 is subjected to lateral pressure by bending of the movable substrate 52 and a push down force to push it down toward the fixed substrate 51 is acted thereon, the move is restricted by the tapered part 521C and the low-melting-point glass 58 is prevented from projecting toward the first surface A side.

Further, since no low-melting-point glass 58 is provided in the cylindrical part 521D, when the movable substrate 52 bends toward the fixed substrate 51 side, the cylindrical part 521D is in a nearly tapered shape that closes from the second surface B toward the first surface A. Accordingly, even when a push up force to move the low-melting-point glass 58 in a direction away from the fixed substrate 51 by the lateral pressure, the low-melting-point glass 58 is restricted from projecting toward the second surface B side by the cylindrical part 521D changed into the tapered shape.

Therefore, the low-melting-point glass 58 may be held in a predetermined position.

Further, the movable substrate 52 having the configuration can be formed in the following manner. That is, at the light transmission opening forming step of the embodiment, first, the cylindrical part 521D having the cylindrical shape is formed by dry etching, and then, the tapered part 521C having the tapered shape is formed by wet etching. Then, after the light transmission opening forming step, for example, a sacrifice layer of a synthetic resin is formed in the cylindrical part 521D. In the formation of the sacrifice layer, for example, the light transmission opening 521A is filled with a sacrifice layer, and then, it may be formed by removing the part corresponding to the tapered part 521C by etching or the like, or it may be formed by embedding a sacrifice layer formed in correspondence with the shape of the cylindrical part 521D into the light transmission opening 521A. It may be formed according to either one of the forming methods.

Further, after the light transmission opening forming step, the low-melting-point glass is formed by executing the low-melting-point glass filling step and the low-melting-point glass grinding step, and then, the sacrifice layer is removed. Furthermore, the movable substrate 52 having the above described configuration is formed by executing the second SiO$_2$ patterning step, the SiO$_2$ removing step, and the electrode and mirror forming step.

The movable substrate 52 has been a silicon substrate having conductivity, however, it maybe another substrate. In this regard, a substrate having no conductivity may be used, and, in this case, an electrode facing the electrode of the fixed substrate 51 is separately formed in the connection holding part 522.

In the embodiment, the number of the first displacement electrode pads 541B is one, however, not limited to that, may be two or more. In this case, one of them may be used as an application electrode, and the others may be used as detection electrodes. Further, the same is applicable to the second displacement electrode 542.

As the analytical instrument, the instrument of measuring the amounts of light having the respective wavelengths contained in the light to be inspected has been cited as an example, however, the instrument may be applied to other instruments. For example, it may be applied to an optical instrument used as a communication device or the like such as an instrument of extracting the light having a predetermined wavelength by an etalon and reading data containing in the light in a system of providing data in response to light intensity of the lights having the respective wavelengths and communicating data using lights, or an instrument of detecting a light absorption wavelength of a gas and determining the type of the gas.

Further, the silicon substrate may be used for the fixed substrate 51, the light transmission opening 521A may be formed like the movable substrate, and the low-melting-point glass 58 may be provided. Thereby, the etching step of the fixed substrate 51 becomes easier. Since the fixed substrate 51 is fixed and does not bend, it is not necessary to form the tapered hole.

Furthermore, movable parts may be provided on both the fixed substrate 51 and the movable substrate 52, and tapered holes and light transmissive members may be provided in both of them.

The best configuration for embodying the invention has been specifically explained, however, the invention is not limited to it. That is, the invention has been illustrated and explained mainly regarding the particular embodiment, however, persons skilled in the art may make various changes and improvements to the above described embodiments without departing from the scope of the technical idea and then purpose of the invention.

The entire disclosure of Japanese Patent Application No. 2010-030994, filed Feb. 16, 2010 is expressly incorporated by reference herein.

What is claimed is:

1. A tunable interference filter comprising:
    a first substrate having light transmissivity;
    a second substrate opposed and bonded to one surface side of the first substrate;
    a first reflection film provided on the one surface of the first substrate;
    a second reflection film provided on a first surface of the second substrate facing the first substrate and opposed to the first reflection film via a gap; and
    a variable part that varies the gap,
    wherein the second substrate includes
    a light transmission hole formed in a position facing the first reflection film along a substrate thickness direction and penetrated from the first surface of the second substrate to a second surface opposite thereto, and
    a light transmissive member provided within the light transmission hole,
    the light transmission hole is formed in a tapered shape having a diameter dimension of an inner circumferential surface increasing from the first surface toward the second surface, and
    the light transmissive member has a light incident surface in parallel to the first reflection surface and the second reflection surface, a light exiting surface in parallel to the first reflection surface and the second reflection surface, and a tapered side surface having a diameter dimension increasing from the first surface toward the second surface, and the tapered side surface is in contact with the inner circumferential surface of the light transmission hole.

2. The tunable interference filter according to claim 1, wherein the second reflection film is provided within a plane of the light exiting surface.

3. The tunable interference filter according to claim 1, wherein the first substrate is formed by glass having movable ions,
    the second substrate has conductivity, and
    the first substrate and the second substrate are bonded by anodically-bonding.

4. The tunable interference filter according to claim 1, wherein the second substrate is formed by silicon.

5. A light sensor comprising:
    the tunable interference filter according to claim 1; and
    a light receiving unit that receives light to be inspected transmitted through the tunable interference filter.

6. An analytical instrument comprising the light sensor according to claim 5.

* * * * *